United States Patent [19]
Wills

[11] 4,146,920
[45] Mar. 27, 1979

[54] PRE-CHARGE CIRCUIT FOR AUX-COMM INVERTER

[75] Inventor: Frank E. Wills, York, Pa.

[73] Assignee: Borg-Warner Corporation, Chicago, Ill.

[21] Appl. No.: 850,115

[22] Filed: Nov. 10, 1977

[51] Int. Cl.² .............................................. H02M 5/45
[52] U.S. Cl. ....................................... 363/27; 363/138
[58] Field of Search ..................... 363/27, 28, 135–138

[56] References Cited

U.S. PATENT DOCUMENTS

| | | | |
|---|---|---|---|
| Re. 27,193 | 10/1971 | Risberg | 363/138 |
| 3,207,974 | 9/1965 | McMurray | 363/136 |
| 3,219,905 | 11/1965 | Davis et al. | 363/138 |
| 3,405,346 | 10/1968 | Krauthamer | 363/137 X |
| 3,559,038 | 1/1971 | Krauthamer | 363/135 |

Primary Examiner—William M. Shoop
Attorney, Agent, or Firm—James J. Jennings, Jr.

[57] ABSTRACT

An input rectifier supplies d-c energy for an auxiliary-commutated inverter. A logic circuit provides gating signals for the semiconductor switches in the input rectifier circuit and in the inverter circuit. A pre-charge circuit provides an independent path to charge the commutating capacitor in the inverter when the system is energized. The gating signals to the input rectifier are delayed by a predetermined time interval, allowing the commutating capacitor in the inverter to be charged and thus ensure effective commutation when the inverter commences operation.

4 Claims, 2 Drawing Figures

PRE-CHARGE CIRCUIT FOR AUX-COMM INVERTER

BACKGROUND OF THE INVENTION

In the field of power conversion, the translation of a d-c voltage into an a-c voltage is generally accomplished by a controllable switching system termed an inverter. Different types of inverters have been developed and implemented. A bridge type inverter generally comprises two thyristors or other semiconductor switches coupled in series between the bus conductors, and the a-c load conductor is coupled to the common connection between the thyristors. A pair of commutating capacitors is coupled between the bus conductors, with a common connection at their electrical midpoint coupled to the center of a commutating conductor, which is itself coupled between the thyristors. In this brige inverter arrangement, different systems have been employed to be certain the commutating capacitors are sufficiently charged before the d-c voltage is applied to the bus conductors. Some have devised specific arrangements of the thyristor circuit to facilitate the pre-charge operation. See for example U.S. Pat. No. 3,559,038, entitled "Inverter with Pre-charge Circuit" which issued to Stanley Krauthmer on Jan. 26, 1971.

The auxiliary-commutated (aux-comm) inverter, in lieu of a passive commutating arrangement, ultilizes two additional switches which are selectively gated on to shut off the main thyristors. A similar problem has been encountered in the aux-comm inverter art, as it is still necessary to initially charge the commutating capacitor to be certain that the inverter will operate effectively during system start-up. Sometimes this problem has been approached by a brute-force method, in which a relay is energized when the system is initially powered up, to complete a circuit for pre-charging the commutating capacitor, while at the same time some other means is utilized to delay application of the d-c energizing voltage to the inverter bus. Of course this entails additional expense for the relay and control components, and occupies a larger physical space than would otherwise be required.

It is therefore a main object of the present invention to provide an improved start-up energization arrangement for an aux-comm inverter, which is simpler and less expensive than known arrangements.

SUMMARY OF THE INVENTION

The present invention is useful with a system for energizing an auxiliary-commutated inverter which has a plurality of semiconductor switches, and also has a commutating capacitor series-connected with a commutating inductor. An input rectifier circuit, which includes at least one controllable component, receives an a-c input voltage and provides a d-c voltage to energize the inverter. A logic arrangement is connected to provide gating signals for regulating operation of the input rectifier circuit and the inverter. A pre-charge circuit includes a transformer and a pair output conductors for supplying a d-c voltage to pre-charge the commutating capacitor.

Particularly in accordance with the present invention, a pair of isolation resistors is utilized to complete the circuit for precharging the commutating capacitor. One of the isolation resistors is connected to one of the pre-charge output conductors and to one side of the commutating capacitors, and the other resistor is connected between the other pre-charge output conductor and the other side of the commutating capacitor. In addition a delay means is connected to prevent application of the d-c voltage to the inverter bus conductors until a predetermined time after the pre-charge voltage is applied to the charging capacitor. In a preferred embodiment this was accomplished by preventing application of any gating signal to the controllable component in the input rectifier circuit for such predetermined time. This allows the commutating capacitor to be fully charged before the input rectifier circuit supplies any d-c energizing voltage to the inverter.

THE DRAWING

In the several figures of the drawing, like reference numerals identify like components, and in that drawing;

FIG. 1 is a block diagram of a pre-charge system for an aux-comm inverter in accordance with this invention; and FIG. 2 is a schematic diagram setting out details of the system shown more generally in FIG. 1.

DETAILED DESCRIPTION OF THE INVENTION

Figure 1:
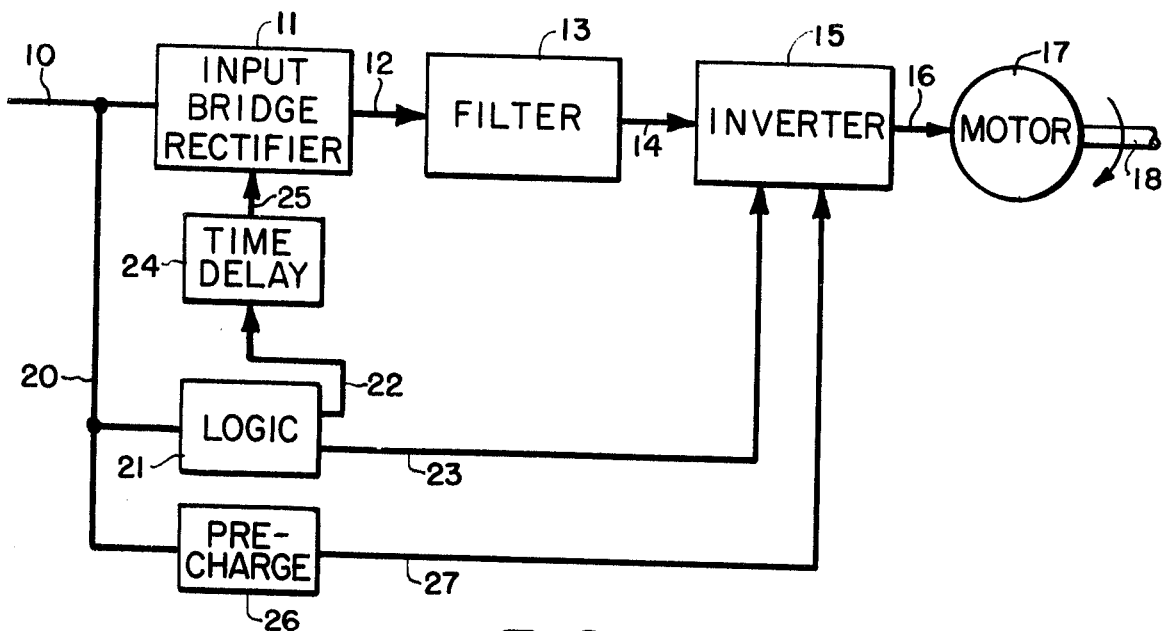

FIG. 1 depicts a drive system in which input a-c energy received over line 10 is rectified in input bridge rectifier circuit 11, passed over line 12, filter 13 and line 14 to provide a d-c energizing voltage for inverter 15. The output a-c voltage produced by the inverter is passed over line 16 to energize any suitable load, such as motor 17 which is depicted driving a shaft 18.

In addition, the input a-c energy is also passed from line 10 over line 20 to a logic circuit 21 which rectifies the energy and, through logical circuit components, provides (1) gating signals on line 22 to regulate the turn-on and turn-off of at least one controllable component (not shown) in the input bridge rectifier, and (2) appropriate gating signals over line 23 for the individual semiconductor switches (not shown) within inverter 15. As shown the gating signal for the input bridge rectifier 11 is delayed in a time delay circuit 24 before being applied over line 25 to the rectifier circuit 11.

The output voltage from pre-charge circuit 26 is applied over line 27 to inverter 15, to charge the commutating capacitors described above before the input bridge rectifier is activated. It is noted that although a time delay circuit 24 is illustrated as the means for delaying the application of a d-c voltage over line 14 to the inverter 15, other systems for delaying the application of the bus voltage can be substituted for the illustrated arrangement without departing from the spirit and scope of the present invention.

Figure 2:
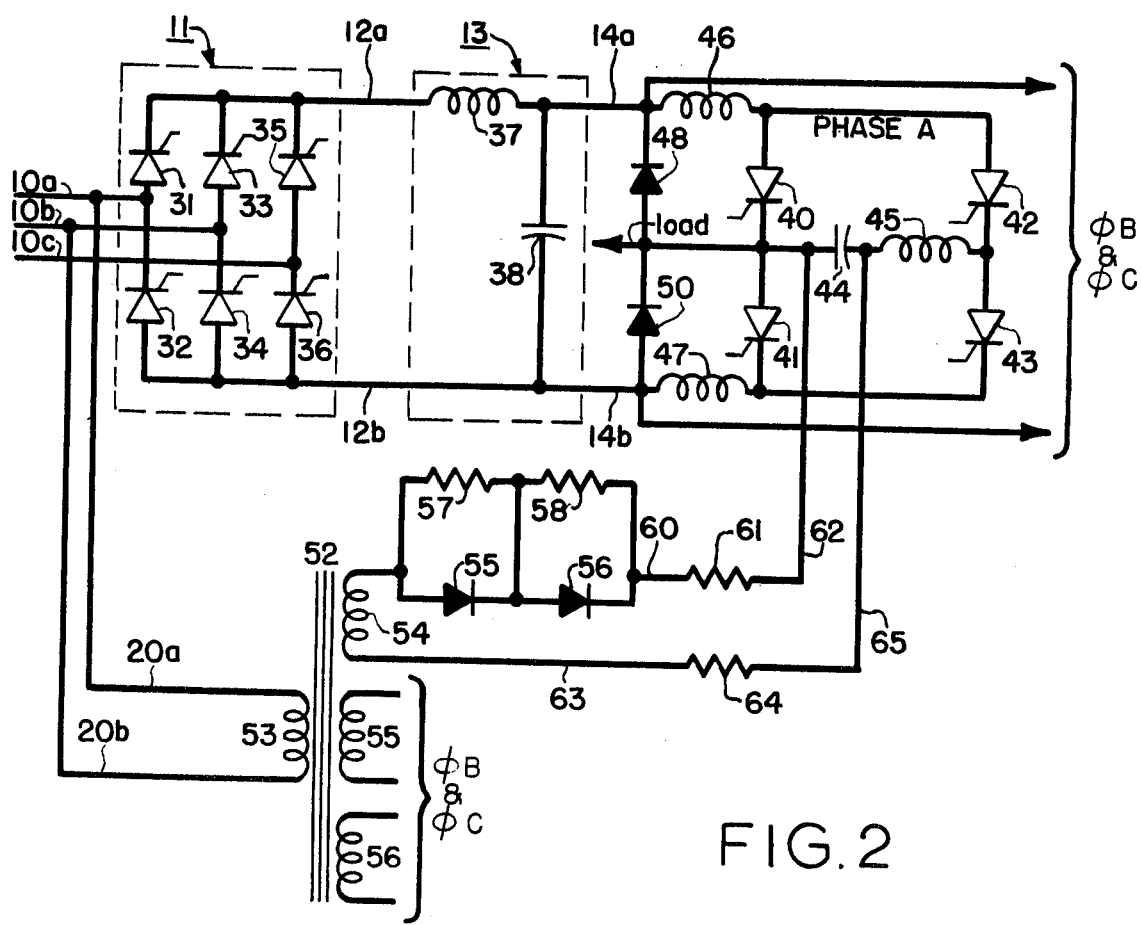

FIG. 2 depicts three input conductors 10a, 10b, and 10c for receiving a three phase a-c voltage in a manner well-known and understood in the art. Similarly, the input bridge rectifier circuit 11 includes six thyristors or controllable components 31–36, so that selective gating of these thyristors under the regulation of logic circuit 21 governs the amplitude of the d-c voltage provided on conductors 12a, 12b. Of course, in a single-phase system only two input conductors 10a, 10b are needed, and the system could operate with only a single controllable component 31, with the thyristor 32 replaced by a diode in a manner well-known and understood in the art. The d-c voltage is filtered by the filter 13, which includes a series-connected inductor 37 and a parallel-connected capacitor 38. The resultant filtered d-c energizing voltage is supplied over the bus conductors 14a, 14b to energize phase circuit A of the three-phase aux-comm inverter represented by the numeral 15 in FIG. 1. Only one phase circuit of the inverter is shown in FIG. 2, as that is sufficient for an understanding of the pre-charge arrangement of the present invention, and in fact would be the arrangement if a single-phase inverter were utilized.

The phase A inverter system comprises main thyristors 40,41 and auxiliary thyristors 42,43. The series circuit including commutating capacitor 44 and commutating inductor 45 is connected between the common connection between the main thyristors and the common connection between the auxiliary thyristors. A first inductor 46 is coupled between bus conductor 14a and the anodes of thyristors 40,42, and a second inductor 47 is coupled between the other bus conductor 14b and the common connection of the cathodes of the thyristors 41,43. Such an aux-comm inverter circuit is now known and has been successfully utilized for circuits with relatively high voltages, of the order of a thousand volts, applied to the bus conductors. The energy return diodes 48, 50 are connected between the bus conductors in a well-known manner. One suitable circuit actually tested and successfully operated included a commutating capacitor 44 of the order of 70 microfarads, and its associated inductor 45 was a seven microhenry inductor. Each of the inductors 46,47 was approximately 12 microhenries. It is apparent that the commutating inductor 45 cooperates with either of the inductors 46,47, depending on which of the main thyristors 40,41 is being turned off at any one time, and thus it is the total inductance of inductor 45 and the then-connected inductor 46 or 47 which is important in determining the characteristics of the commutating circuit.

A pre-charge transformer 52 has a single primary winding 53, coupled to the supply conductors 20a,20b, and has three secondary windings 54,55 and 56. Secondary winding 54 is coupled to a half-wave rectifier circuit including a pair of series-connected rectifiers 55,56. Resistors 57,58 are coupled in parallel with the diodes 55,56 to ensure accurate voltage division across these two diodes in a manner well-known and understood in this art.

Particularly in accordance with this invention, the rectified voltage from the first pre-charge circuit output conductor 60 is applied over an isolation resistor 61 and conductor 62 directly to one side of commutating capacitor 44. The other output conductor 63 of the pre-charge circuit is likewise coupled over another isolation resistor 64 and another conductor 65 to the other side of the commutating capacitor 44. It has been found that this system is effective to charge the capacitor 44 to an effective commutating voltage level with only a slight delay, of the order of 20 to 30 seconds, provided by time delay circuit 24 before the one or more controllable components in rectifier circuit 11 are energized to produce the d-c bus voltage at conductors 14a,14b. Thus this arrangement has saved the expense and physical volume previously attributed to an additional relay utilized to selectively make the connection over conductors 62,65 and then interrupt the connection after the appropriate pre-charge voltage was applied across capacitor 44. Those skilled in the art will appreciate that the time delay provided by stage 24 need not be in the circuit which delays energization of the input bridge rectifier, but can be any suitable arrangement for delaying the application of the d-c input voltage to the bus conductors of the inverter.

In the appended claims the term "connected" means a d-c connection between two components with virtually zero d-c resistance between those components. The term "coupled" indicates there is a functional relationship between two components, with the possible interposition of other elements between the two components described as "coupled" or "inter-coupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A system for energizing an auxiliary-commutated inverter having a plurality of semiconductor switches and having a commutating capacitor series-connected with a commutating inductor, an input rectifier circuit including at least one controllable component, operable to receive an a-c input voltage and provide a d-c voltage to energize the inverter, a logic arrangement connected to provide gating signals to the input rectifier circuit and to the inverter, and a pre-charge circuit including a transformer and a pair of pre-charge output conductors for supplying a d-c voltage to pre-charge the commutating capacitor, characterized by:
   a pair of isolation resistors, one connected between one of the pre-charge output conductors and one side of the commutating capacitor, and the other resistor connected between the other of the pre-charge output conductors and the other side of the commutating capacitor; and
   delay means, connected to prevent application of any d-c voltage to the inverter until a predetermined time after the d-c voltage is applied to the commutating capacitor, allowing the capacitor to be pre-charged for effective commutation.

2. A system as claimed in claim 1, in which the delay means is coupled between the logic arrangement and the input rectifier circuit, thus delaying the application of gating signals to the input rectifier circuit for said predetermined time.

3. A system for energizing a three-phase auxiliary-commutated inverter in which each phase circuit has two main thyristors and two auxiliary thyristors, and has a commutating capacitor series-connected with a commutating inductor, a three-phase input rectifier circuit including at least three semiconductor switches, operable to receive a three-phase a-c input voltage and provide a d-c voltage to energize the inverter, a logic arrangement connected to provide gating signals to the semiconductor switches in the input rectifier circuit and to the thyristors in the inverter, and a pre-charge circuit including a transformer and three pairs of pre-charge output conductors for supplying three d-c voltages to pre-charge the commutating capacitor in each phase circuit of the inverter, each pre-charge secondary circuit being characterized by:
   a pair of isolation resistors, one connected between one of the pre-charge output conductors and one side of the commutating capacitor, and the other resistor connected between the other of the pre-charge output conductors and the other side of the commutating capacitor; and
   delay means, connected to prevent application of any d-c energizing voltage to the inverter circuit until a predetermined time after the d-c voltage is applied to the charging capacitor, allowing the capacitor to be pre-charged for effective commutation.

4. A system as claimed in claim 3, in which the delay means is coupled between the logic arrangement and the input rectifier circuit, thus delaying application of gating signals to the semiconductor switches in the input rectifier circuit for said predetermined time.

* * * * *